United States Patent [19]

Fujiwara et al.

[11] 4,242,620
[45] Dec. 30, 1980

[54] AUTOMATIC WELDING LINE TRACING METHOD AND APPARATUS

[75] Inventors: Osamu Fujiwara, Funabashi; Takeshi Araya, Shimoinayoshi; Tsugio Udagawa, Ibaraki, all of Japan

[73] Assignees: Hitachi, Ltd.; Hitachi Seiko Ltd., both of Japan

[21] Appl. No.: 918,276

[22] Filed: Jun. 22, 1978

[30] Foreign Application Priority Data

Jun. 24, 1977 [JP] Japan .................. 52/74325

[51] Int. Cl.³ ............................................ G05B 19/33
[52] U.S. Cl. ................................. 318/576; 219/124.22; 219/124.34; 219/125.12
[58] Field of Search ............... 219/124.22, 124.34, 219/125.12; 318/576

[56] References Cited

U.S. PATENT DOCUMENTS

| 3,268,805 | 8/1966 | Normando | 219/124.34 |
| 4,125,943 | 11/1978 | Ando | 219/124.34 |

FOREIGN PATENT DOCUMENTS

2631250  2/1977  Fed. Rep. of Germany ...... 219/124.22

OTHER PUBLICATIONS

M. S. L'Vov et al., "Method of Compensating for an Error in Height at Edges of Joint in Tracking Systems . . . " Svar. Proiz, 1967, #9, pp. 42-43.
S. A. Kolyubakin, "An Automatic System for Guiding the Electrode along Butt Joints during Argon Tungsten Arc Welding . . . ", Art. Svarka, 1969, #10, pp. 52-55.
Y. O. Laptenok et al., "A Ferro-Probe Sensor of the Position of the Welding Head Relative to the Join", Svar. Proiz, 1975, #5, pp. 33-35.

*Primary Examiner*—C. C. Shaw
*Attorney, Agent, or Firm*—Craig & Antonelli

[57] ABSTRACT

An automatic welding line tracing method and apparatus for causing a welding torch to follow the welding line by using a single non-contact-type sensor for detecting the welding line which is continuously reciprocated to traverse the groove of two pieces to be welded. During the reciprocating motion of the sensor, the sensor generates output voltages $E_1$ and $E_2$ respectively obtained by detecting the both ends of the groove to obtain $E_1-\delta$ and $E_2-\delta$ on the basis of the detected voltages $E_1$, $E_2$ and a separately established reference voltage $\delta$, and an output voltage $P_S$ corresponding to the central position of the groove is obtained from $E_1-\delta$ and $E_2-\delta$ to thereby compare the voltage $P_S$ with a voltage indicative of the central position of the oscillating motion of the sensor to thereby cause the welding torch to follow the welding line in accordance with the difference between these two voltages.

1 Claim, 4 Drawing Figures

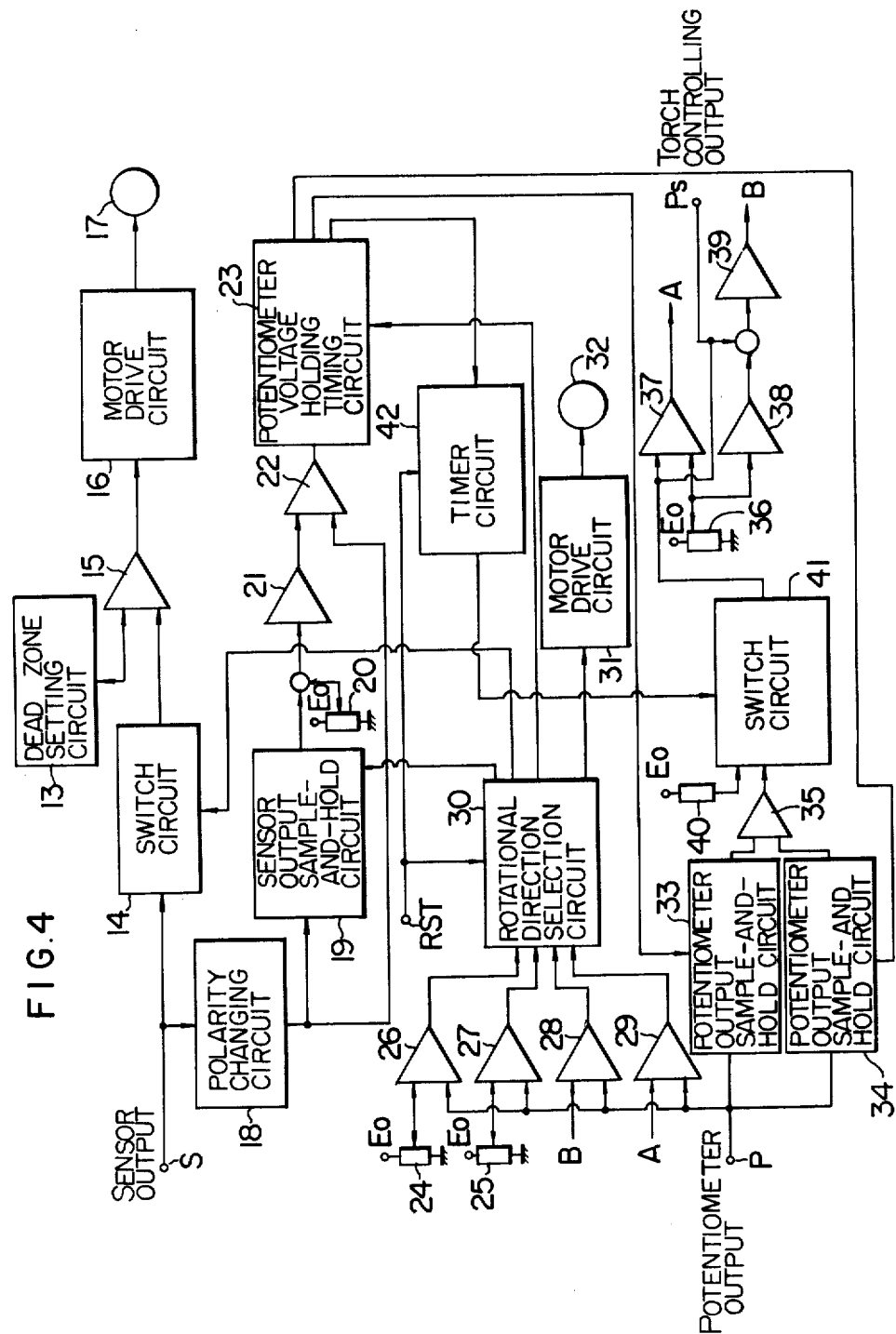

AUTOMATIC WELDING LINE TRACING METHOD AND APPARATUS

The present invention relates to a method and apparatus wherein a welding line including a groove is detected in a non-contact manner to cause a welding torch to follow the welding line with a high degree of accuracy.

The conventional method of an automatic welding line tracing are disadvantageous in terms of accuracy. More specifically, with a known method of the type employing a contact-type sensor as a welding line detecting means, the accuracy of the tracing is greatly influenced by the surface conditions of the sensor contacting portions of plates to be welded and the accuracy of tracing operation is dependent on the presence of a tack weld beads and the presence of spatter. Further, the portion of the sensor which contacts the plates consists of a steel ball, roller or the like, and consequently the tracing accuracy is also affected by the mechanical smoothness of the contacting portion. On the other hand, the known non-contact-type methods employing a sensor of electrical, magnetic, optical or other type are not only impractical due to the large size and poor operating quality of the apparatus, but also impractical due to the effects of arc light, heat, fume, spatter, etc., produced during welding.

With a view to overcoming the foregoing difficulty, it is the object of the present invention to provide an automatic welding line tracing method and apparatus capable of causing a welding torch to accurately follow a welding line including a groove, thus facilitating automation of the welding operation.

With an automatic welding line tracing method of this invention, a welding torch is caused to follow a welding line of plates to be welded which includes a groove by obtaining output voltages $E_1$ and $E_2$ respectively corresponding to the groove ends by a single sensor which is reciprocated over the plates in a non-contacting manner to traverse the groove of the plates, obtaining $E_1-\delta$ and $E_2-\delta$ from the output voltages $E_1$ and $E_2$ and a separately established reference voltage $\delta$, obtaining an output voltage $P_S$ corresponding to the central position of the groove from $E_1-\delta$ and $E_2-\delta$, obtaining the difference between the groove central position voltage $P_S$ and a predetermined voltage representing the central position of the sensor oscillating motion and then generating a signal representing the difference or providing correction to reduce the difference to zero.

An automatic welding line tracing apparatus provided in accordance with the invention comprises a non-contact-type sensor for tracing a welding line, a moving base with a drive motor for reciprocating the non-contact-type sensor at a predetermined height above the surface of the plates to be welded in a direction perpendicular to the longitudinal direction of the groove of the plates, another moving base holder with a drive motor for adjusting to a desired value the distance of the non-contact-type sensor from the plates over the plates surfaces including the groove ends, a position detector operatively associated with the non-contact-type sensor to detect the position of the sensor, and a control unit adapted to generate through the position detector a signal representing the central position of the groove in accordance with a change in the output of the non-contact-type sensor caused by the movement of the sensor in the direction perpendicular to the groove.

More specifically, the sensor is continuously reciprocated to move across the groove of the plates to generate sensor detection output signals (analog signals) corresponding to the both ends of the groove (at which the sensor oscillating movement is stopped), whereby when the detection output signals generated during the oscillating movement of the sensor agree with predetermined values which are respectively lower than the sensor detection output signals by a value $\delta$, then the current position of the sensor is detected by a displacement measuring device such as a potentiometer. The detected position is generated as a signal to control the position of the welding torch or alternatively it is used as a signal for the ordinary trace operation. To ensure a high degree of accuracy despite some amount of irregularity in the groove due to the assemblying accuracy of plates to be welded or the dimensional and working accuracy of the groove, when the sensor reaches each end of the groove, the elevation position of the sensor from the plate surfaces is adjusted to minimize the amount of detection error of the groove center due to a change in the detection height of the sensor.

The above and other objects, features and advantages of the present invention will appear fully from the following description taken in conjunction with the accompanying drawings, in which:

FIG. 4 is a block diagram of a control circuit for performing the invention.

Figure 1:
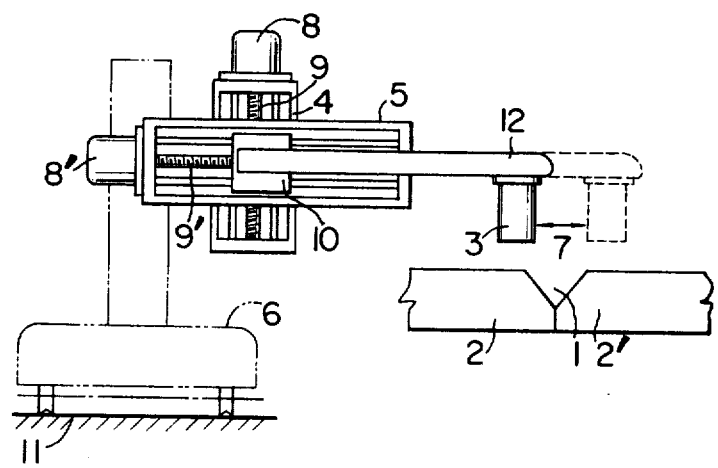
FIG. 1 is a schematic diagram showing the sensor driving portion of an automatic welding line tracing apparatus according to the present invention.

Referring now to FIG. 1, there is illustrated the mechanical parts of an embodiment of the invention. In the Figure, numeral 1 designates a groove defined by plates 2 and 2' to be welded together. A carriage 6, carrying thereon a traverse moving base 5 and a vertical moving base 4, is movable over rails 11 which are arranged substantially parallel to the welding line. The moving bases 4 and 5 are designed so that a movable part 10 is respectively moved vertically and traversely through threaded shafts 9 and 9' by the forward and reverse rotations of drive motors 8 and 8' which are respectively mounted on one ends of the moving bases 4 and 5. The traverse moving base 4 is mounted on the vertical moving base 5. A groove detecting non-contact-type sensor 3 is attached to the movable part 10 through an arm 12. The sensor 3 is moved transversely with respect to the longitudinal direction of the groove from one side to the other side of the groove as shown by an arrow 7 repeatedly to cover the width of the groove 1 in response to alternate repetitions of the forward and reverse operations of the drive motor 8' along with the movement of the carriage 6 to the direction of the welding line (to the direction of the rails 11). When the sensor 3 is moved, its position is always detected by a position detector (not shown) mounted on the moving base 5. While this detector may easily be comprised of a potentiometer, it is possible to use any other device, such as, an encoder or differential transformer which is capable of detecting displacement.

Figure 2:
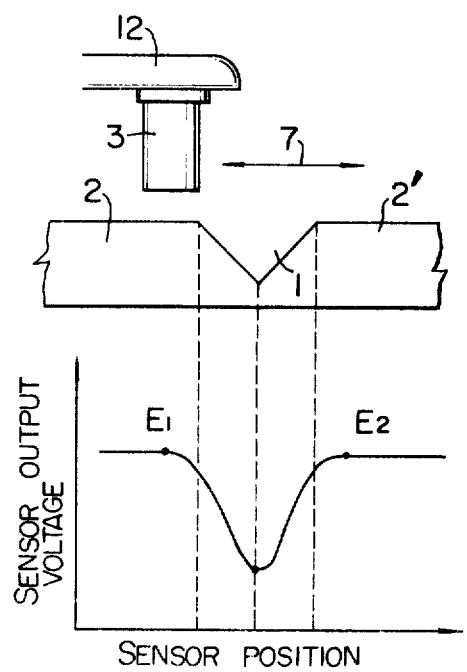
FIG. 2 is a diagram showing the sensor adapted for movement across the groove and the output signal voltage waveform of the sensor.

FIG. 2 shows the relationship between the output voltage and the position of the non-contact-type sensor 3. When the sensor 3 is moved across the groove 1 from the plate 2 to the plate 2' at a predetermined height, the sensor output changes from $E_1$ to $E_2$ continuously as shown in FIG. 2 in accordance with the contour of the groove, and consequently by predetermining any sensor output voltage, it is possible to determine the position of the sensor which corresponds to the predetermined voltage. A welding line tracing method and apparatus according to this concept will now be described.

Figure 3:
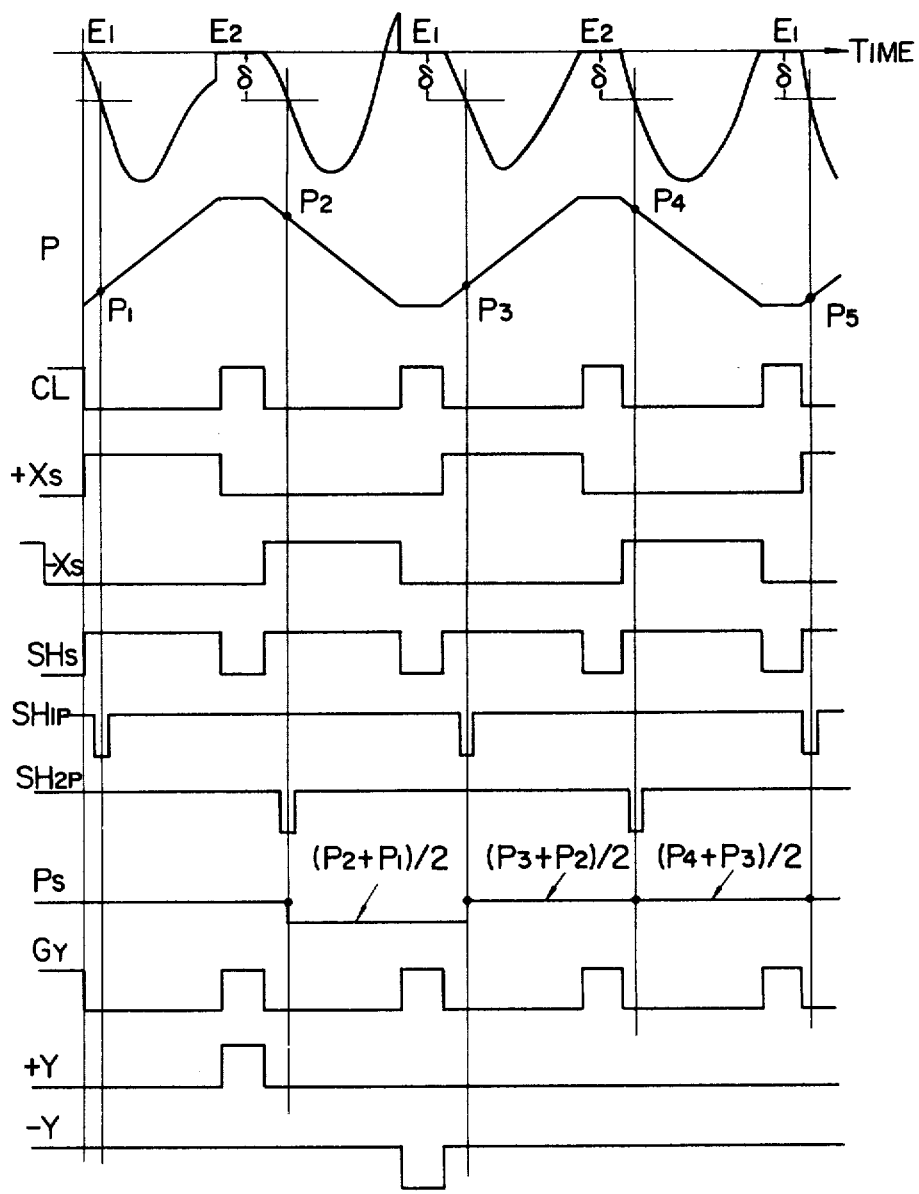
FIG. 3 is a time chart useful in explaining the operation of the automatic welding line tracing apparatus according to the invention.

FIG. 3 is a timing diagram useful for explaining the welding line tracing operation. In the Figure, the abscissa represents the time in relation to the movement of the sensor. Symbol E designates a sensor output voltage, P an output voltage of a potentiometer for detecting the traverse position of the sensor, CL clock pulses each width indicative of the off period of the traverse moving base drive motor 8', $+X_S$ and $-X_S$ voltages respectively indicative of the forward and reverse operation periods of the traverse moving base drive motor 8', $SH_S$ clock pulses each for holding the sensor output voltage at the time of stopping the movement of the sensor, $SH_{1P}$ and $SH_{2P}$ timing pulses for holding the output voltage of the potentiometer which is used for detecting the central position of the width of the groove, $P_S$ an output voltage indicating the central position of the width of the groove, $G_Y$ pulses for correcting the vertical position of the sensor when the sensor stops moving, and $+Y$ and $-Y$ voltages applied to the drive motor for correcting the sensor vertical position. In the Figure, one cycle of the oscillating movement of the sensor is represented by the time interval from one $E_1$ to the next $E_1$. In response to a clock pulse $SH_S$, the sensor output voltage $E_1$ generated from the sensor stopping above the edge of the groove on the plate 2 side is sampled and held to establish a value $E_1 - \delta$ obtained by subtracting the value of an arbitrarily predetermined reference voltage $\delta$ from the value of the output voltage $E_1$. When the output voltage of the sensor is opposite in polarity, a value $E_1 + \delta$ is established. After the value has been established, the forward movement of the reciprocating oscillating motion is initiated so that the sensor is moved in a direction to traverse the groove and the sensor eventually detects the value ($E_1 - \delta$) at a certain point. When this detecting point is reached, a timing pulse $SH_{1P}$ for holding the output voltage of the potentiometer is generated and the potentiometer output voltage is held. Assuming now that $E_2$ represents the sensor output voltage generated when the sensor reaches the edge of the plate 2' after it has moved across the groove. As was the case when the sensor was above the edge of the groove on the plate 2 side, the voltage $E_2$ is sampled and held in synchronism with a sample-hold pulse $SH_S$ to establish a value $E_2 - \delta$, and the output voltage of the potentiometer generated at a point where the sensor detects the value $E_2 - \delta$ is held in synchronism with a timing pulse $SH_{2P}$.

The sum of the two potentiometer output voltages which are thus continuously sampled and held is multiplied by ½ times to generate the output $P_S$. In this case, if the circuit construction is such that the computation of the output $P_S$ is accomplished by always using the previously sampled and held potentiometer output voltages, the output $P_S$ can be corrected twice during one cycle period of the reciprocating motion of the sensor. In the case of welding the actual plates to be welded, some amount of irregularity occurs in the groove during the assembling the plates. If, in this case, the height of the sensor is adjusted to maintain the detecting height of the sensor constant at the time of stopping the sensor in every reciprocating motion thereof, the amount of detecting error of the groove central position due to the irregularity of the detecting height of the sensor can be reduced with the resulting increase in tracing accuracy.

FIG. 4 shows the construction of a control circuit for performing the above-mentioned tracing operation in an analog manner. In the Figure, symbol P designates the potentiometer output, S the sensor output, and $P_S$ the torch controlling output.

In operation, when a tracing operation initiation signal is applied to a rotational direction selection circuit 30 for traversely moving the sensor through a reset terminal RST, the rotational direction selection circuit 30 causes a sensor drive motor 32 for traversely driving the sensor to rotate only in one direction through a motor drive circuit 31. This rotation causes the sensor to move in one direction. Now, in order that the amplitude of the oscillating movement of the sensor may sufficiently cover the width of the groove, the upper and lower limits of the amplitude of the oscillating movement of the sensor are respectively set by the resistance values of variable resistors 24 and 25 for setting an initial amplitude of the oscillating movement. The voltages across the variable resistors 24 and 25 are always compared with the outputs P of the potentiometers by means of comparators 26 and 27 respectively to thereby determine the rotational direction of the motor 32. In this condition, when the sensor moves one half cycle after the initiation of the oscillating movement, a sensor output sample-and-hold timing pulse $SH_S$ is applied to a sensor output sample-and-hold circuit 19 from the output of a timer incorporated in the rotational direction selection circuit 30, and the sample-and-hold circuit 19 samples and holds the sensor output applied thereto through a polarity changing circuit 18 in response to the stopping of the drive motor 32. Then, a value $\delta$ preset by a $\delta$ setting variable resistor 20 supplied with a power supply voltage $E_O$ is subtracted from output voltage of the sampled and held sensor 19 and the resulting value is applied through an amplifier 21 to a comparator 22 where it is compared with the output voltage of the sensor generated in response to the movement of the sensor across the groove. Consequently, every time the output value of the amplifier 21 coincides with the sensor output voltage, a potentiometer voltage holding timing circuit 23 generates and applies a holding timing pulse to one of potentiometer output sample-and-hold circuits 33 and 34 alternately, that is, once for the sensor forward and backward movements, respectively.

By so arranging that a timer circuit 42 is not brought into operation and a switch circuit 41 passes the output of a ½ fold amplifier 35 during the time interval that the potentiometer voltage holding timing circuit 23 generates its output pulse for each of half cycle of the oscillating movement of the sensor, an output $P_S$ can be produced from the potentiometer output P through the sample-and-hold circuits 33 and 34. When the output $P_S$ is generated, an amplitude setting variable resistor 36 determines the range of the amplitude of the sensor oscillating movement on the basis of the value of $P_S$ as a center value of the oscillation, and a reference voltage A is generated on the basis of the voltage $P_S$ and the output of the resistor 36 through a comparator 37, and a reference voltage B is generated on the basis of the voltage $P_S$ and the output of the resistor 36 through a sign inverting amplifier 38 and an amplifier 39. The reference voltages B and A are applied to comparators 28 and 29 respectively thereby comparing the reference voltages with the potentiometer output P to adjust the oscillating amplitude to the proper value. In this condition, the comparators 26 and 27 are no longer in operation. As a result, during the periods of tracing operation, the output of the sample-and-hold circuits 33 and 34, respectively, is applied to the ½ fold amplifier 35 to compute an output $P_S$.

Where there are tack weld beads along the welding line, the potentiometer voltage holding timing circuit 23 no longer applies any timing pulse to the potentiometer output sample-and-hold circuits 33 and 34 so that the potentiometer output is no longer subjected to sample-and-hold operation, and the output $P_S$ is maintained at the values which were sampled and held just before the movement of the sensor across the tack welded portion. In this case, the potentiometer voltage holding timing circuit 23 applies a signal to the timer circuit 42 so that upon the expiration of a predetermined time after the application of this signal, the switch circuit 41 comes into operation thereby blocking the output of the ½ fold amplifier 35 and delivering an output $P_S$ from the power source $E_O$ through a fixed resistor 40. Thus, the oscillating movement amplitude of the sensor is automatically returned to a restarting condition. To avoid this returning to a restarting condition, it is only necessary to preset into the timer circuit 42 a suitable time which is determined in consideration of the length of the tack weld beads and the welding speed.

On the other hand, the detecting elevation position of the sensor is corrected in the following process. When the drive motor 32 is stopped, the rotational direction selection circuit 30 applies a height correction timing pulse to a switch circuit 14 in response to the timer included in the circuit 30 and so the switch circuit 14 pass the sensor output. The sensor output is compared with an output voltage value of a dead zone setting circuit 13 in a comparator 15. Consequently, when the height of the sensor must be corrected, the height is corrected by a sensor vertical direction correction motor 17 through a sensor vertical direction correction drive circuit 16 in accordance with the output of the comparator 15. This height correction may be accomplished once for every cycle of the sensor oscillating movement or twice for every cycle of the sensor oscillating movement (once for the stopping of the motor in response to each groove end) by suitably controlling the timing of generation of the timing pulses from the circuit 30. In accordance with the present invention, however, as a method of correcting the sensor height, twice correction for every cycle of the sensor oscillating movement is employed, since the tracing accuracy can be improved to the maximum degree by correcting the sensor height at each of the both ends of the groove.

It will thus be seen from the foregoing description that in accordance with the present invention, a predetermined value is subtracted from a sensor output voltage generated when a non-contact-type sensor is positioned at each end of a groove and the central position of the groove is detected twice for every cycle of the sensor oscillating movement on the basis of the subtracted value, thus ensuring a high degree of tracing accuracy even in the cases involving some irregularity in the groove or relatively inferior dimensional accuracy of the groove. Further, by virtue of the fact that the detection of the traverse and vertical positions of the sensor is effected by changing the circuits, only the single sensor is needed instead of two used in the prior art methods, thus simplifying the construction. There is another advantage that in the case of welding of the groove of thick plates each having a multi-layer, even if the groove contour varies by every layer, there is no need to particularly renew the reference voltage δ for welding line detection and the multi-layer welding can be easily effected up to the last layer.

What we claim is:

1. An automatic welding line tracing apparatus comprising:

a non-contact-type sensor for tracing a welding line;

a first moving base with a drive motor disposed to reciprocate said non-contact-type sensor in a direction normal to said groove of said plates at a predetermined height from upper surfaces of said plates;

a second moving base with a drive motor disposed to correct to a desired value the height of said non-contact-type sensor from said plates at each of two ends of said groove over said surfaces;

a position detector operatively associated with said non-contact-type sensor to detect the position thereof; and a control unit whereby when said non-contact-type sensor is moved in said direction normal to said groove, a voltage representing a central position of said groove is generated through said position detector in response to variation in an output of said sensor wherein said control unit comprises a rotational direction selection circuit (30) disposed to receive signals applied through variable resistors (24, 25) and comparators (26, 27) disposed to determine upper and lower limits to a oscillating amplitude of said sensor and signals applied from comparators (28, 29) disposed to determine an oscillating amplitude of said sensor for a trace operation to thereby determine a direction of oscillation of said sensor, a sample-and-hold circuit (19) responsive to a timing pulse output of said rotational direction selection circuit (30) to sample and hold the output of said sensor to produce voltages $E_1$ and $E_2$ respectively corresponding to the ends of said groove, a comparator (22) disposed to compare the output of said sensor with $E_1-\delta$ and $E_2-\delta$, respectively, a circuit (23) whereby when the output of said sensor agrees with said $E_1-\delta$ and $E_2-\delta$, respectively, a timing pulse for sampling and holding a potentiometer output P corresponding to a position of said sensor is generated, circuits (33, 34) each responsive to said timing pulse to sample and hold said potentiometer output P corresponding to a sensor position, an amplifier circuit (35) disposed to increase by ½ times an output of said circuits (33,34), respectively, a switch circuit (41) whereby when there is the generation of no sample-and-hold pulse for sampling and holding said potentiometer output corresponding to a sensor position, a timer circuit (42) is actuated in response to an output of said timing pulse generating circuit (23) to block the output of said amplifier circuit (35) for a predetermined time to thereby receive a separately established output of a reference voltage generating circuit (40), setting means (36) disposed to set the range of said sensor oscillating to a desired value in accordance with the output of said amplifier circuit (35), a circuit whereby a difference between an output of said switching circuit (41) and an output of said setting means (36) is applied as a reference voltage to said comparators (28, 29), respectively, to compare the same with said potentiometer output P to provide a proper oscillating amplitude and a circuit (16) whereby when said sensor is over said plates, a switch circuit (14) is brought into operation in response to a timing pulse signal from said rotational direction selection circuit (30) and the output of said sensor is compared with an output voltage value of a dead zone setting circuit (13) by a comparator (15) to thereby correct the height of said sensor.

* * * * *